United States Patent [19]

Hendricks

[11] Patent Number: 4,675,218
[45] Date of Patent: Jun. 23, 1987

[54] PROTECTIVE PAD FOR BATTERY BOXES

[76] Inventor: Steven A. Hendricks, 819 E. 'C' St., Iron Mountain, Mich. 49801

[21] Appl. No.: 777,962

[22] Filed: Sep. 19, 1985

[51] Int. Cl.⁴ .............................................. B32B 27/00
[52] U.S. Cl. .................................. 428/35; 427/372.2; 427/389.9; 427/412; 427/443.2; 428/280; 428/282; 428/284; 428/288; 428/289
[58] Field of Search ............... 428/137, 280, 282, 284, 428/288, 289, 35; 427/372.2, 389.9, 412, 443.2

[56] References Cited

U.S. PATENT DOCUMENTS 4,179,274 12/1979 Moon ................................. 428/280

Primary Examiner—Marion C. McCamish
Attorney, Agent, or Firm—Thomas J. Dodd

[57] ABSTRACT

A protective pad for use with a battery box on other acid collecting media. the pad is formed of absorbent material and includes an alkaline material impregnated in one portion of the pad to neutralize acid absorbed from a battery or other source.

17 Claims, 2 Drawing Figures

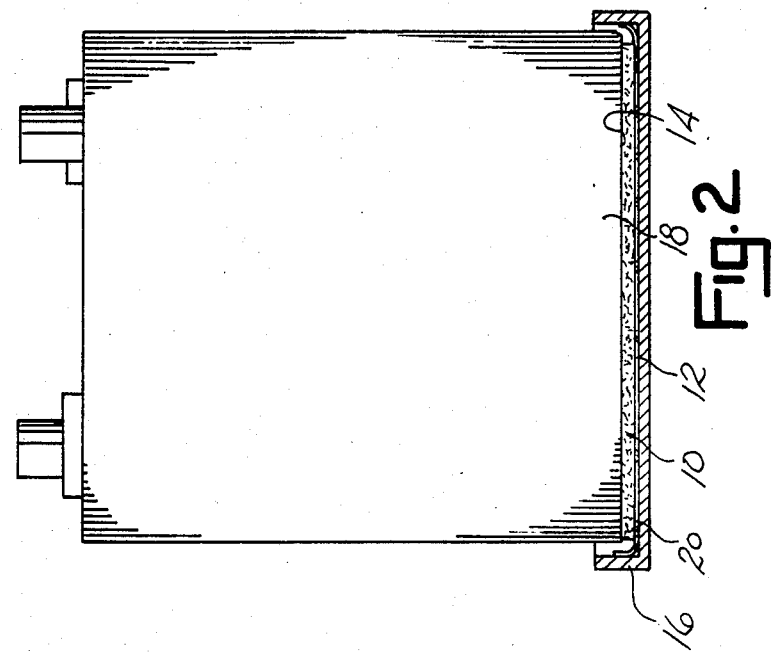
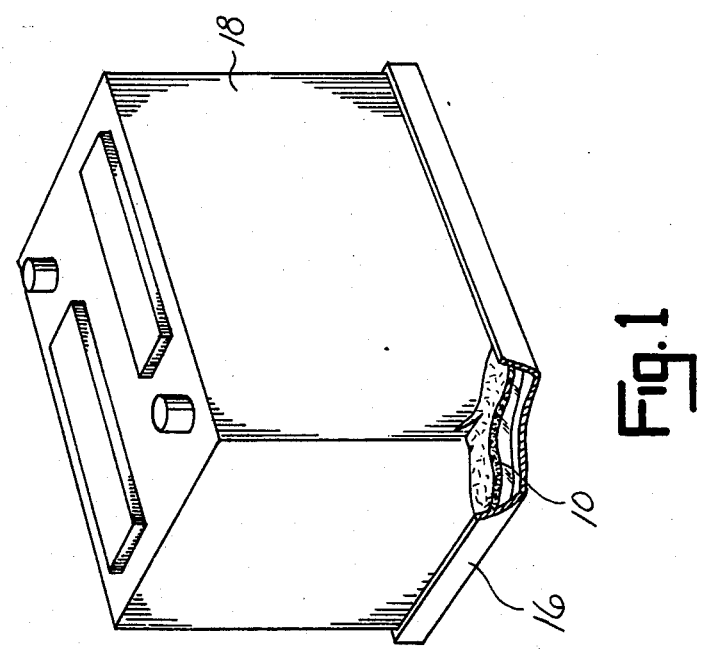

PROTECTIVE PAD FOR BATTERY BOXES

SUMMARY OF THE INVENTION

This invention relates to a protective pad and will have special application to an alkaline pad for neutralizing acid in vehicle battery boxes.

Vehicles and other machines which have electric starters often include batteries housed in metal battery boxes. Battery fluid contains a percentage of highly corrosive sulfuric acid, and leakage of the fluid into the metal box results in corrosion of the box. Eventual leakage of fluid into the engine compartment may lead to potential engine or body damage. Previously, individuals attempted to solve the problems of acid leakage by sprinkling an alkaline powder (such as sodium bicarbonate) into the battery box. This procedure is often inefficient in neutralizing the acid and can lead to alkaline corrosion if the excess powder is not properly washed off the battery box. The pad of this invention is formed of highly absorbent material which has been partially impregnated with an aqueous solution of a mild alkaline material. The pad is placed beneath the battery in the battery box, where acid leakage is absorbed into the pad and neutralized by the alkaline material.

Accordingly, it is an object of this invention to provide a protective pad which is for neutralizing acid spills.

Another object of this invention is to provide an alkaline pad which is for a battery box.

Another object of this invention is to provide for a battery box pad which inhibits acid and alkaline corrosion of the box.

Another object of this invention is to provide for a battery box pad which is safe to use and essentially maintenance free.

Still another object of this invention is to provide for a novel method of producing a protective pad which is for neutralizing acid spills.

Other objects of this invention will become apparent upon a reading of the following description.

BRIEF DESCRIPTION OF THE DRAWINGS

A preferred embodiment of the invention has been depicted for illustrative purposes wherein:

FIG. 1 is a perspective view of a battery and a battery box shown in fragmented form to depict the protection pad in use.

FIG. 2 is a longitudinal sectional view of the pad and battery box.

DESCRIPTION OF THE PREFERRED EMBODIMENT

The preferred product and method herein described is not intended to be exhaustive or to limit the invention to the precise form or steps described. It is chosen and described to explain the principles of the invention and the application and practical use to enable others skilled in the art to utilize the invention.

Pad 10 shown in the drawing may be best understood by following the method steps below. Pad 10 is preferably formed of acid corrosion resistant material such as high density wool felt. The pad is immersed at one side in a heated aqueous solution of an alkaline material whose pH is from 7-10. The preferred alkaline material is sodium bicarbonate in an aqueous solution ranging in concentration from 0.5 to 3.5 molar (M).

After pad 10 has been thoroughly soaked (from 0.10 hours to 3 hours soak time), it is removed from the solution and allowed to dry for 24-48 hours at room temperature. During this time, solid alkaline material precipitates on one side 12 as well as throughout pad 10. Excess water is then removed by wringing the pad or passing it through a pinch roller.

Additional alkaline material may then be impregnated into the pad by the following procedure. Pad 10 is perforated by any accepted method (such as by a nail press) and then steeped in a concentrated (4.0M to 10.0M) solution of alkaline material as above. The pad is then allowed to drip dry until it is dry to the touch.

Due to the high surface tension of sulfuric acid, it is not readily absorbed into wool-based materials. If wool felt or similar material is used to form pad 10, the opposite side 14 of the pad should be treated to allow absorption of the spilled sulfuric acid into the pad. The preferred absorption agent is a solution of an ionic exchange medium commonly found in commercial fabric softeners, and is applied to pad face 14 by spraying after the pad is dry.

Pad 10 is then placed in battery box 16 beneath battery 18 with side 14 adjacent the battery (FIGS. 1 and 2). A plastic liner 20 may be positioned in battery box 16 with pad 10 overlying the liner.

EXAMPLE

A piece of high density wool felt (98% wool felt) was cut into a rectangular pad 11½ inches long, 7½ inches wide, and ⅛ inch thick. The pad was soaked on one side for two hours in a 2M aqueous solution of $NaHCO_3$ at 80° F. The pad was then removed from solution and allowed to dry for 24 hours. Excess water was wrung out of the pad and the pad perforated on the one side by nail press. The pad was then steeped in a 5M paste of $NaHCO_3$ for ten minutes, then removed from the paste and allowed to dry. When the pad was dry to the touch, the opposite side was sprayed for ten seconds with an aqueous solution of Downy ® Triple Concentrate Fabric Softener. The solution contained 2 parts water to 1 part fabric softener. The pad was again allowed to dry and then placed in a battery box with the alkaline-treated side down.

It is to be understood that the invention is not limited to the above-given details, but may be modified within the scope of the appended claims.

I claim:

1. In combination, a battery box which carries a battery, and a protective member positioned in said battery box for absorbing acid leakage from said battery, said protective member comprising a pad formed of corrosion resistant absorbent material, said pad including first and second opposite side faces, an alkaline material applied to said pad first face.

2. The combination of claim 1 wherein said pad is formed of high density wool felt.

3. The combination of claim 2 wherein said alkaline material has a pH value of 7-10 at 25° C.

4. The combination of claim 3 wherein said alkaline material is sodium bicarbonate.

5. The combination of claim 2 and a wetting agent applied to said pad second face, said wetting agent constituting means for facilitating absorbency of said acid into said pad.

6. The combination of claim 5 wherein said wetting agent is a solution of an ionic exchange medium.

7. The combination of claim 2 wherein said pad first face includes perforations therein.

8. A method of producing a protective member for absorbing and neutralizing battery acid comprising the steps of:
   (a) Providing a pad formed of acid corrosion resistant absorbent material, said pad having said first and second sides; and
   (b) Impregnating an alkaline material into said pad first side.

9. The method of claim 8 wherein step (b) includes the steps of:
   (i) soaking said pad in an aqueous solution of said alkaline material; and
   (ii) allowing said pad and alkaline material to dry.

10. The method of claim 9 wherein step (b)(i) includes soaking said pad in an aqueous solution of sodium bicarbonate at 80° F. for 0.1-3 hours.

11. The method of claim 10 wherein said sodium bicarbonate solution ranges in concentration from 0.5M to 3.5M.

12. The method of claim 9 wherein step (b)(ii) includes allowing said pad to set at room temperature for 24-48 hours.

13. The method of claim 9 and a step (c) of removing excess water from said pad.

14. The method of claim 13 and a step (d) of perforating said pad one side, then impregnating a solution of alkaline material into the pad perforations.

15. The method of claim 14 wherein said alkaline material is sodium bicarbonate ranging in concentration from 4.0 to 10.0M.

16. The method of claim 9 and a step (e) of applying a wetting agent to said pad second side.

17. The method of claim 8 and an additional step of positioning said pad in a battery box, then positioning a battery so that it adjacently overlies said pad first side wherein acid leakage from said battery is neutralized by said pad prior to the acid contacting said battery box.

* * * * *